Oct. 7, 1941.  G. V. THOMAS  2,258,079

BATTERY TERMINAL CLAMP

Filed March 25, 1940

INVENTOR.
George V. Thomas
BY Florian G. Miller
ATTORNEY.

Patented Oct. 7, 1941

2,258,079

UNITED STATES PATENT OFFICE 2,258,079

BATTERY TERMINAL CLAMP

George V. Thomas, Erie, Pa.

Application March 25, 1940, Serial No. 325,741

2 Claims. (Cl. 173—259)

This invention relates generally to clamps and more particularly to a clamp for connection to a battery terminal post. All clamps of this character made according to the teachings of the prior art and with which I am familiar have been very inefficient in that they would easily corrode and become unserviceable. Some of these prior clamps have been made of lead and like soft material to resist the acids from the battery, but they were found to be too soft and threads cut therein would strip easily. These prior clamps would come loose and destroy the filaments in all of the lights in the car.

It is accordingly an object of my invention to provide a battery terminal clamp which overcomes the above and other defects in battery terminal clamps and it is more particularly an object of my invention to provide a battery terminal clamp which is simple in construction, cheap in cost, easy to manufacture and efficient in operation.

Another object of my invention is to provide a battery terminal clamp which is non-corrosive.

Another object of my invention is to provide a battery terminal clamp which maintains a tight connection.

Another object of my invention is to provide a battery terminal clamp which is adjustable to accommodate battery posts of various sizes.

Another object of my invention is to provide a battery terminal clamp which will not freeze tight to the terminal post.

Another object of my invention is to provide protective means for the terminal end of the cable connecting the battery terminal post.

Another object of my invention is to provide resilient washers to cover the exposed portion of the connecting bolt.

Another object of my invention is to provide reinforcing means in the body of the battery terminal connector.

Another object of my invention is to provide a die-cast battery terminal clamp.

Other objects of my invention will become evident from the following detailed description taken in conjunction with the accompanying drawing in which.

Figure 1:
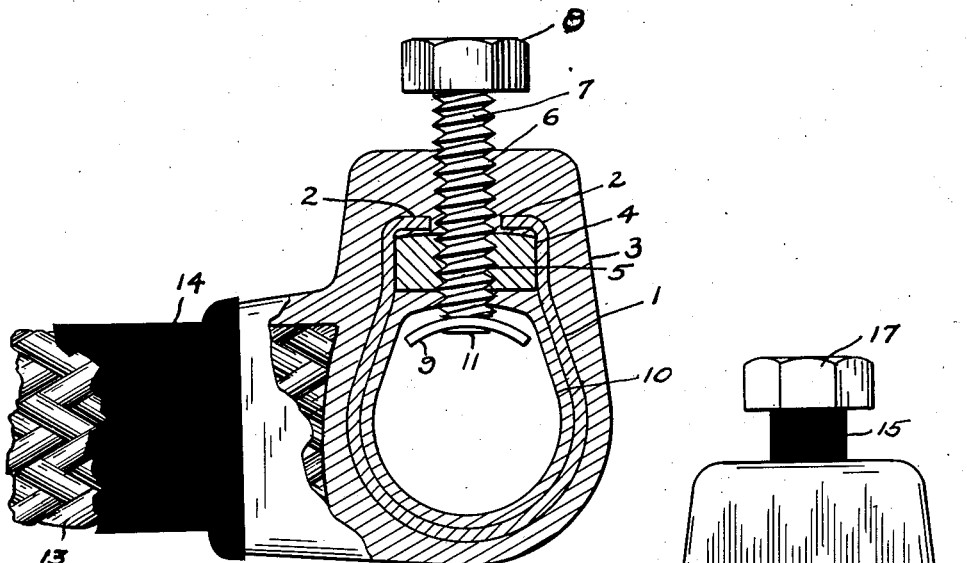
Fig. 1 is a fragmentary side elevational view, partly in section, of my novel battery terminal clamp.
Figure 2:
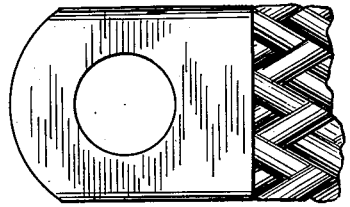
Fig. 2 is a fragmentary view of the opposite end of the battery cable.
Figure 3:
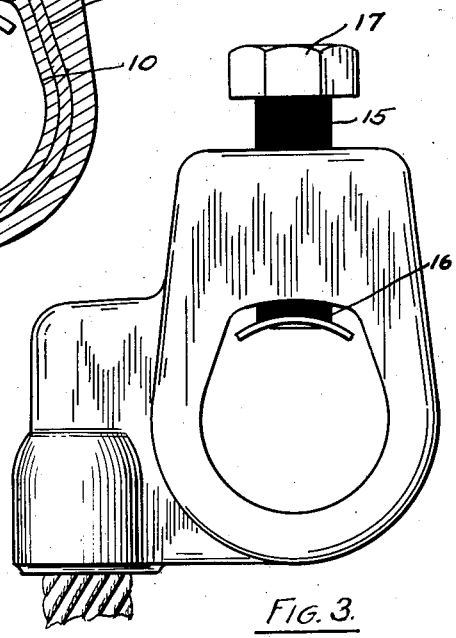
Fig. 3 is a side elevational view of my novel battery clamp showing resilient washers on the tightening bolt.
Figure 4:
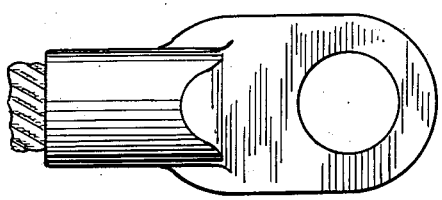
Fig. 4 is a fragmentary view of another form of end for a battery connecting cable.
Figure 5:
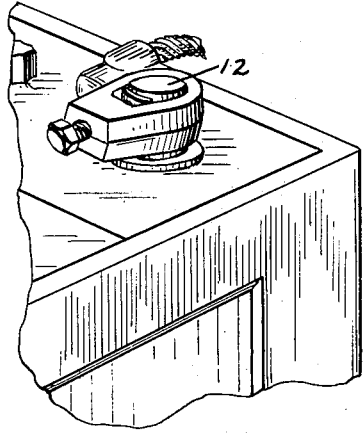
Fig. 5 is a perspective view of the applicant's novel battery connector connected to a battery terminal.

In referring to the drawing, Fig. 1 shows a reinforcing member 1 of general U-shaped construction with inturned flanged portions 2 die-cast into a body 3 of lead or any other suitable material resistant to corrosion. A rectangular member 4, having a threaded aperture 5, is die-cast into the body 3, along with the reinforcing member 1 adjacent to the flange portions 2. The body 3 has an internally threaded aperture 6, coinciding with the internally threaded aperture 5 in the rectangular member 4, wherethrough passes a threaded clamping bolt 7. The bolt 7 has a head 8 on the exterior portion thereof and a semi-circular member 9 disposed on the free end thereof in the aperture 10 formed in the body 3. The semi-circular member 9 moves freely on the end of the bolt 7 and is free to turn on the bolt 7. The semi-circular member 9 is held on the end of the bolt 7 by peening the end portion 11 thereof. The member 9 is semi-circular in shape in order that it may better grip a battery terminal 12, as shown in Fig. 5. Rubber 14 or any other suitable material is disposed on the end of the cable 13 adjacent to the terminal end thereof in order to prevent corrosion of the cable from the acids exuding from the battery. The rubber 14 may be applied by spraying, vulcanizing or by a cemented tube or any other suitable form of covering material resistant to acid. Resilient washers 15 and 16, shown in Fig. 3, surround the bolt member 17 to prevent corrosion of the exposed portions of the bolt member. The material used in the bolts comprises about 85% nickel, along with other materials resistant to corrosion in order to bring the possibility of corrosion to a minimum.

It will be evident that the reinforcing member 1, which is preferably made of steel, along with the rectangular member 4 permits the screw bolt 7 to move through the body 3 of the battery clamp without stripping any of the threads because of the strength of the steel in the rectangular member 4. It will be apparent that without these reinforcing steel members the threads would strip very easily. The rectangular member 4 is so disposed internally of the U-shaped reinforcing member 1 and adjacent to the inturned flanged portions 2 thereof, so as to prevent any rotation or other movement of the rectangular member in the lead body 3 of the battery terminal clamp.

In manufacture the rectangular member 4 is disposed internally of the reinforcing member 1 adjacent to the flanged portions thereof, whereupon these members are die-cast in a body 3 with an aperture 10 formed therein to provide for the entry of a battery terminal post. It was found that dipping members in lead to prevent corrosion was not satisfactory because the lead did not adhere and it would very quickly be worn or knocked off of the surface which it covered.

Various changes may be made in the specific embodiment of the present invention without departing from the spirit thereof or from the scope of the appended claims.

What I claim is:

1. In a battery terminal connector, in combination, a die-cast clamp comprising a lead alloy body portion having an aperture for receiving a battery terminal post, a longitudinally extending threaded aperture, and a battery cable receiving aperture, a reinforcing member cast in and entirely covered by said lead alloy body portion of circular configuration having the ends thereof flanged outwardly in parallel relationship and inwardly towards each other, an internally threaded hard metal member disposed internally of said reinforcing member adjacent said inturned flanged ends having a threaded aperture in alignment with the threaded aperture in said body portion, a screw bolt engaging said threaded portions of said hard metal member and said body portion for clamping said connector to a battery terminal post, and a semicircular shaped member freely mounted on the inner end of said screw bolt to engage a battery terminal post, the threaded aperture in said body portion and in said hard metal member covering substantially the entire threaded portion of said screw bolt.

2. In a battery terminal connector, in combination, a die-cast clamp comprising a lead alloy body portion having an aperture for receiving a battery terminal post, and a longitudinally extending threaded aperture, a reinforcing member cast in and entirely covered by said lead alloy body portion being of circular configuration with the ends thereof flanged outwardly in parallel relationship and inwardly toward each other, an internally threaded hard metal member disposed internally of said reinforcing member adjacent said inturned flanged ends and having a threaded aperture in alignment with the threaded aperture in said body portion, a screw bolt engaging said threaded portions of said hard metal member and said body portion, said hard metal member and said body portion covering substantially the entire threaded portion of said screw bolt, and a freely mounted substantially semicircular clamping member disposed on the inner end of said screw bolt to clamp said connector to a battery terminal post.

GEORGE V. THOMAS.